United States Patent
Pecharsky et al.

(10) Patent No.: US 6,773,692 B2
(45) Date of Patent: Aug. 10, 2004

(54) METHOD OF PRODUCTION OF PURE HYDROGEN NEAR ROOM TEMPERATURE FROM ALUMINUM-BASED HYDRIDE MATERIALS

(75) Inventors: Vitalij K. Pecharsky, Ames, IA (US); Viktor P. Balema, Ames, IA (US)

(73) Assignee: Iowa State University Research Foundation, Inc., Ames, IA (US)

(*) Notice: Subject to any disclaimer, the term of this patent is extended or adjusted under 35 U.S.C. 154(b) by 27 days.

(21) Appl. No.: 10/167,556

(22) Filed: Jun. 12, 2002

(65) Prior Publication Data

US 2003/0026757 A1 Feb. 6, 2003

Related U.S. Application Data

(60) Provisional application No. 60/309,668, filed on Aug. 2, 2001.

(51) Int. Cl.[7] .................................................. C01B 3/04
(52) U.S. Cl. .................................... 423/658.2; 180/54.1
(58) Field of Search ....................... 423/658.2; 180/54.1, 180/54.2

(56) References Cited

U.S. PATENT DOCUMENTS 4,200,624 A * 4/1980 Muller et al. ............... 423/644
6,106,801 A * 8/2000 Bogdanovic et al. ..... 423/648.1
6,231,636 B1 * 5/2001 Froes et al. .................. 75/352

OTHER PUBLICATIONS

Balema et al., *Chem. Comm.*, 1665–1666 (2000).
Balema et al., *J. Alloys Compounds*, 313, 69–74 (2000).
Dymova et al., *Russ. J. Coord. Chem.*, 25(5), 312–315 (1999).
Pecharsky et al., in: *EPD Congress 2002, Fundamentals of Materials for Energy Conversion* (Chandra et al., eds.), 95–107 (The Minerals, Metals and Materials Society, Warrendale, PA) (Feb. 2002).

* cited by examiner

Primary Examiner—Stanley S. Silverman
Assistant Examiner—Maribel Medina
(74) Attorney, Agent, or Firm—Leydig, Voit & Meyer, Ltd.

(57) ABSTRACT

The present invention provides a cost-effective method of producing pure hydrogen gas from hydride-based solid materials. The hydride-based solid material is mechanically processed in the presence of a catalyst to obtain pure gaseous hydrogen. Unlike previous methods, hydrogen may be obtained from the solid material without heating, and without the addition of a solvent during processing. The described method of hydrogen production is useful for energy conversion and production technologies that consume pure gaseous hydrogen as a fuel.

21 Claims, 6 Drawing Sheets

METHOD OF PRODUCTION OF PURE HYDROGEN NEAR ROOM TEMPERATURE FROM ALUMINUM-BASED HYDRIDE MATERIALS

CROSS-REFERENCE TO RELATED PATENT APPLICATIONS

This patent application claims the benefit of U.S. Provisional Patent Application No. 60/309,668, filed Aug. 2, 2001.

STATEMENT REGARDING FEDERALLY SPONSORED RESEARCH AND DEVELOPMENT

This invention was made in part with Government support under Grant Number W-7405-ENG-82 awarded by the Department of Energy. The Government may have certain rights in this invention.

FIELD OF THE INVENTION

This invention pertains to the production of pure gaseous hydrogen from a solid hydride at ambient temperatures by processing the solid hydride in an appropriate environment.

BACKGROUND OF THE INVENTION

During the last decade, a rapidly growing demand for novel energy production technologies, which are alternative to burning basic commodities (e.g., oil, natural gas and coal) and atomic fusion, has significantly increased the importance of hydrogen ($H_2$) as a clean and renewable source of energy. Despite exceptional efficiency attainable by the direct conversion of the chemical energy of hydrogen oxidation into electrical energy (e.g., using a fuel cell), broad use of hydrogen is severely limited by the physical properties of the element (e.g., hydrogen is gaseous at ambient conditions and boils under atmospheric pressure at 20° K.). Successful transition to hydrogen-based fuel technology, therefore, requires development of new approaches to transportation, storage, and delivery of significant amounts of pure hydrogen for its use in modern energy generating devices such as, for example, fuel cells. One of the most efficient solutions of the transportation, storage, and delivery problem is to accumulate externally produced hydrogen in the form of compact and safe solid hydride materials (see, e.g., G. Sandrock, in *Hydrogen Energy Systems, Utilization of Hydrogen and Future Aspects*, Ed.: Y. Yürüm, p. 135, Kluwer Academic Publishers (1995)).

To be economical, solid materials for hydrogen storage should be able to store at least 4.5% of hydrogen by weight (4.5 wt. % hydrogen), i.e., be so-called ultra-high capacity hydrogen storage solids. Such solid hydrides also should easily and controllably release hydrogen at operating conditions of a fuel cell or similar device, preferably at ambient temperature and pressure (see, e.g., Ogden et al., *J. Power Sources*, 79:143 (1999) and Gunther et al., *J. Alloys Compds.*, 293:889 (1999)). Recently, solid hydrides have been utilized that comprise certain complex derivatives of aluminum hydride ($AlH_3$), usually referred to as complex aluminohydrides ($M'_xM_y(AlH_n)_z$) where M' is Li, Na, or K; M is Mg, Ca, Sr, or Ba; x is 0 or 1; y is an integer between 0 and 3; z is an integer between 1 and 7; and n is an integer between 3 and 6. Two essentially different approaches to extraction of hydrogen gas from these complex aluminohydrides are currently routinely practiced in the art.

The first approach is the thermal decomposition of $AlH_3$ and complex aluminohydrides at temperatures between 60° C. and 250° C. (see, e.g., Bogdanovic et al., *J. Alloys Compd.*, 253:1 (1997), Zidan et al., *J. Alloys Compd.*, 285:119 (1999), Jensen et al., *Int. J. Hydrogen Energy*, 24:461 (1999), Bogdanovic et al., *J. Alloys Compd.*, 302:36 (2000), Dilts et al., *Inorg. Chem.*, 11:1230 (1972), Ashby, *Adv. Inorg. Chem. and Radiochem.*, 8:283 (1966), Dymova et al., *Russ. J. Coord. Chem.*, 21:165 (1999), Bastide et al., *Stud. Inorg. Chem.*, 3:785 (1983), International (PCT) Patent Application WO 99/24355, and German Patent Application DE 19,526,434). One of the most commonly used solid hydrides has been lithium aluminohydride ($LiAlH_4$). In the case of the pure $LiAlH_4$, the thermal decomposition proceeds in two steps according to Equations 1 and 2 set forth below, and enables generation of a total of 7.9 wt. % hydrogen between 160° C. and 230° C. (see, e.g., Dilts et al. (1972), supra, Dymova et al. (1999), supra, Bastide et al. (1983), supra, DE 19,526,434 and U.S. Pat. No. 5,882,623):

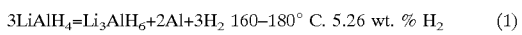

$$3LiAlH_4 = Li_3AlH_6 + 2Al + 3H_2 \quad 160-180° \text{ C. } 5.26 \text{ wt. \% } H_2 \quad (1)$$

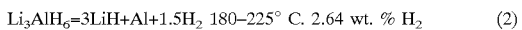

$$Li_3AlH_6 = 3LiH + Al + 1.5H_2 \quad 180-225° \text{ C. } 2.64 \text{ wt. \% } H_2 \quad (2)$$

Although the extraction of hydrogen from a solid hydride enables generation of significant amounts of pure hydrogen gas, its operating parameters are dependent on the thermal stability of the corresponding hydride. For example, sodium aluminohydride ($NaAlH_4$) decomposes at a different temperature and yields smaller amounts of hydrogen per unit weight of the hydride (see, e.g., Dilts et al. (1972), supra). As a result, the thermal decomposition of aluminohydrides cannot be used for hydrogen gas generation at temperatures below the decomposition temperatures of corresponding hydrides, i.e., below approximately 60° C. for $AlH_3$ and about 80–150° C. for other modified complex aluminohydrides (see, e.g., Bogdanovic et al. (1997), supra, Zidan et al. (1999), supra, Jensen et al. (1999), supra, and Bogdanovic et al. (2000), supra). Certain reduction of decomposition temperatures of metal hydrides is achieved by their mechanical pretreatment followed by thermal decomposition (see, e.g., U.S. Pat. No. 5,882,623). The decomposition of metal hydrides using their heating with microwaves or ultrasound also has been reported (see, e.g., U.S. Pat. No. 5,882,623). A disadvantage of the thermochemical approach is that it may be difficult to precisely control the rate of hydrogen delivery, i.e., to rapidly increase or reduce the temperature of a large quantity of the hydrogen storage material to initiate or terminate the flow of hydrogen gas.

The second approach, which enables release of hydrogen gas from aluminum hydride and complex aluminohydrides at ambient conditions, involves the chemical treatment of the solid hydride with stoichiometric amounts of appropriate liquid or gaseous reagents, such as water (see, e.g., Kong et al., *Int. J. Hydrogen Energy*, 24:665 (1999), Lynch et al., *Proc. Intersoc. Energy Convers. Eng. Conf.*, 33$^{rd}$ IECEC217/1-IECEC217/6, (1998), Breault et al., *Proc. Power Sources Conf.*, 39$^{th}$, 184: (2000), Cotton et al., *Advanced Inorganic Chem.*, 6$^{th}$ Ed., New York, Wiley (1999), and Canadian Patent No. 2,028,978), alcohols (see, e.g., Cotton et al. (1999), supra), or ammonia (see, e.g., Lynch et al. (1998), supra). However, a significant disadvantage of this method is inevitable contamination of the produced hydrogen with the vapor of the used reagent. Therefore, chemical treatment of aluminohydrides is unsuitable for generation of pure hydrogen gas.

Because of these limitations, a more efficient method to produce pure gaseous hydrogen is needed. To the best of our knowledge, all known hydrogen storage media with the storage capacity exceeding 4.5 wt. % hydrogen, such as magnesium hydride (MgH$_2$)- and aluminum hydride (AlH$_3$)-based materials, in pure form, are capable to release hydrogen only at temperatures exceeding 100° C. (see, e.g., Bogdanovic et al. (1997), supra, Zidan et al. (1999), supra, Jensen et al. (1999), supra, Bogdanovic et al. (2000), supra, Kostanchuk et al., *Russian Chem. Rev.*, 67:69 (1998), Bifehoom et al., *J. Less-Common Metals*, 74:341 (1980), Friedlmeier et al., *J. Alloys Compds.*, 292:107 (1999), Hammioui et al., *J. Alloy Compds.*, 199:202 (1993), and Ivanov et al., *J. Less-Common Metals*, 13:25 (1987)). Hence, a need remains for the possibility of low-temperature (less than 100° C.) high-capacity (at least 4.5 wt. %) production of pure gaseous hydrogen. Such a method of hydrogen generation is of interest for technologies that consume pure gaseous hydrogen as a fuel, including energy conversion technologies such as fuel cell technology.

The present invention provides such a method. These and other advantages of the invention, as well as additional inventive features, will be apparent from the description of the invention provided herein.

BRIEF SUMMARY OF THE INVENTION

The present invention provides a method of extracting hydrogen from a solid hydride. The method comprises processing the solid hydride at ambient temperature in the absence of chemical treatment such that hydrogen is released from the hydride. The gaseous hydrogen is then collected. In preferred embodiments, the processing comprises mechanical processing in the presence of a catalyst. Such methods allow for the low-temperature, high-capacity production of pure gaseous hydrogen.

DETAILED DESCRIPTION OF THE INVENTION

Figure 1:
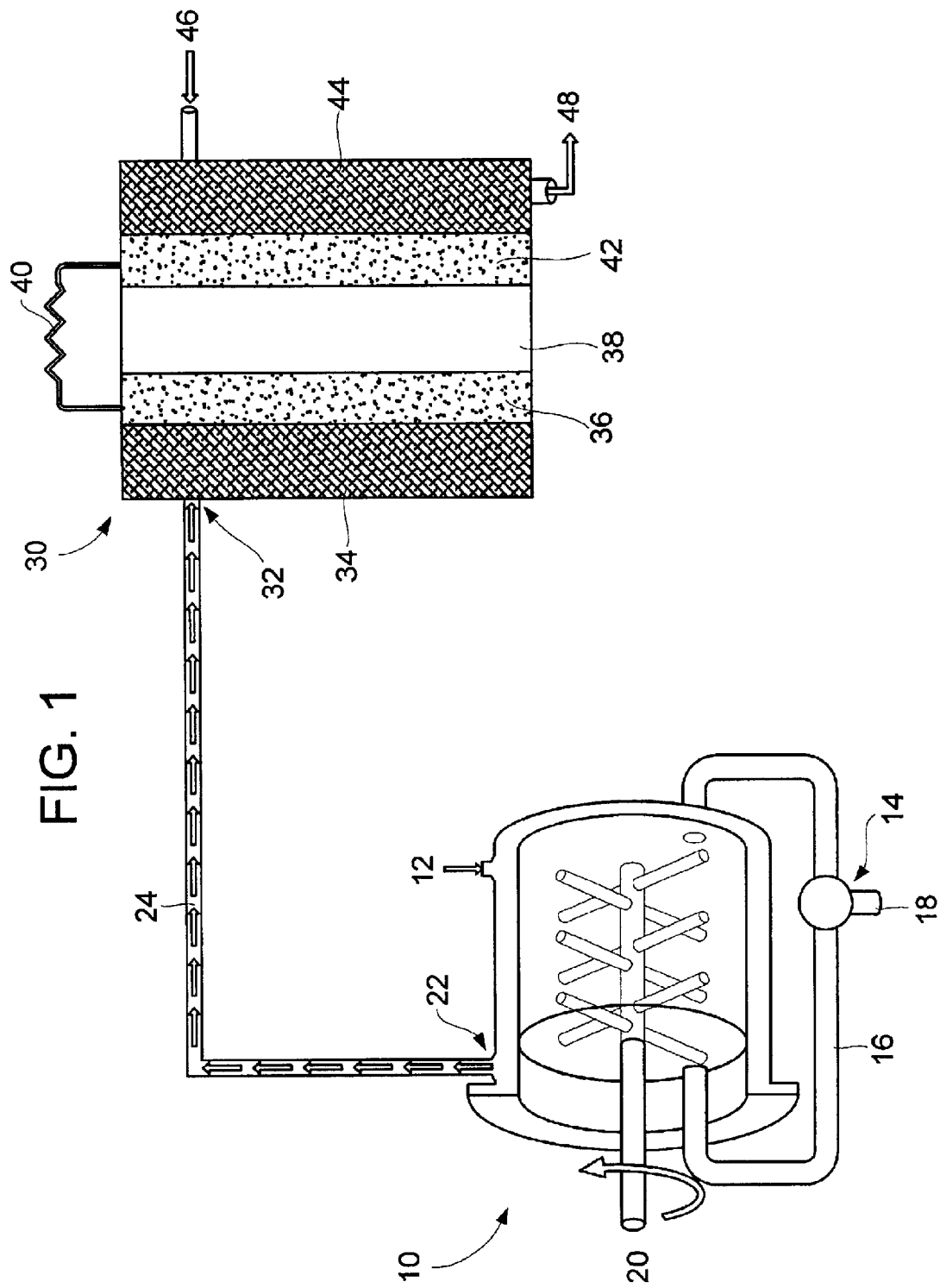
FIG. 1 illustrates a system comprising a milling apparatus connected to a fuel cell via a feed mechanism, which system is useful for the production, delivery, and conversion of hydrogen into electrical energy.

The present invention provides a cost-effective method of hydrogen extraction from ultra-high capacity aluminum hydride based hydrogen storage materials. The method comprises processing the solid hydride at ambient temperature to release hydrogen from the hydride, and collecting the released hydrogen. In such a method, the solid hydride has a storage capacity of at least 4.5 wt. % hydrogen, and the processing is done in the absence of chemical treatment. The present invention also provides a method of extracting hydrogen from a solid hydride comprising mechanically processing the solid hydride in the presence of a catalyst to release hydrogen from the hydride, and collecting the released hydrogen.

Any suitable solid hydride can be used in the context of the present invention. Suitable solid hydrides typically include, for example, hydrides comprising the general chemical composition M'$_x$M$_y$(AlH$_n$)$_z$, where M' is an alkali metal (e.g., Li, Na, or K); M is an alkali earth metal (e.g., Mg, Ca, Sr, or Ba); x is 0 or 1; y is an integer between 0 and 3; z is an integer between 1 and 7; and n is an integer between 3 and 6. Solid hydrides representative of this chemical composition include, for example, mixed lithium-magnesium hydrides, such as (LiMg(AlH$_4$)$_3$) and (Li[Mg$_3$(AlH$_4$)$_7$]). Alternatively, the solid hydride can comprise lithium aluminum hydride (LiAlH$_4$), sodium aluminum hydride (NaAlH$_4$), magnesium aluminum hydride (Mg(AlH$_4$)$_2$), or aluminum hydride (AlH$_3$). Other suitable solid hydrides will be apparent to those skilled in the art. Accordingly, the solid hydrides identified herein are in no way limiting.

Pure gaseous hydrogen is obtained in the required quantities (i.e., at least 4.5 wt. % hydrogen) at a required rate from such solid hydrides in a solvent-free environment at ambient conditions during their processing. By "required rate" is meant processing the solid hydride at a rate sufficient to extract at least 4.5 wt. % hydrogen from the solid hydride. Suitable rates include, for example, processing the solid hydride to release from about 0.005–2 wt. % hydrogen per minute from the solid hydride. Typically, the solid hydride is processed to release from about 0.01–1.5 wt. % hydrogen per minute and, more typically, is processed to release from about 0.04–1 wt. % hydrogen per minute from the solid hydride.

In preferred embodiments, the processing comprises mechanical processing in the presence of an appropriate catalyst. Indeed, any catalyst that is useful to liberate hydrogen from a solid hydride being subjected to mechanical processing can be used. Preferably, the catalyst is a transition metal catalyst, such as a catalyst comprising a transition metal of the $3^{rd}$ (Sc through Zn), the $4^{th}$ (Y through Cd), or the $5^{th}$ (Hf through Hg) period of the periodic table, or lanthanide elements (La through Lu), or their derivatives, or mixtures thereof. More preferably, the catalyst comprises titanium.

Any suitable amount of the catalyst can be used in the context of the present invention to achieve the desired results. While the catalyst can be included in the reaction mixture in a stoichiometric amount, a "catalytic amount" is preferred. By "catalytic amount" is meant that the catalyst is included in the reaction mixture in an amount of about 0.001–50 mol. %. Preferably, the catalyst is included in the reaction mixture in an amount of about 0.1–25 mol. %, about 1–15 mol. %, or even about 1.5–10 mol. %. More preferably, the catalyst is included in the reaction mixture in an amount of about 2–8 mol. %, about 2.5–6 mol. %, or even about 3–5 mol. %.

According to the methods of the present invention, a solid hydride is subjected to a processing (e.g., mechanical processing) in the absence of a solvent at about −200° C. to about 100° C., preferably at about −100° C. to about 75° C., preferably at about −10° C. to about 60° C., preferably at about 0° C. to about 50° C., preferably at about 20° C. to about 40° C., and most preferably at ambient temperature (i.e., room temperature, about 25° C.). Preferably, the reaction takes place in a chemically inert atmosphere, preferably in an inert gas atmosphere (e.g., helium, neon, argon, nitrogen, hydrogen and the like). For example, the reaction can take place in a hardened-steel vial sealed under helium.

The reaction time depends on the nature of the reactants and can vary, in general, between about 0.01 hours to about 100 hours. Preferably, the reaction time is less than 100 hours, more preferably the reaction time is less than 80 hours, even more preferably the reaction time is less than 60 hours, still even more preferably the reaction time is less than 40 hours, further, more preferably the reaction time is less than 20 hours, and even more preferably the reaction time is less than 10 hours, less than 5 hours, and even less than 2 hours.

During the processing, the solid hydride releases pure gaseous hydrogen. It will be understood that the rate of hydrogen release can be increased by more vigorous processing or, alternatively, it can be decreased by reducing the amount of energy input, e.g., mechanical energy input, during processing of the solid hydride. Because different solid hydrides will release gaseous hydrogen at different rates, one skilled in the art can optimize the processing to obtain the desired results.

When mechanical processing is employed in the context of the present invention, the mechanical processing can be carried out in any suitable apparatus, which delivers mechanical energy into the compounds located inside the apparatus. A suitable apparatus may include, for example, a shaker-type ball-mill, a planetary mill or an attritor mill. The size of the milling apparatus can be selected as necessary to process a greater or smaller quantity of the material. The milling apparatus can be coupled with a feed mechanism (e.g., tubing) to continuously or intermittently replenish the supply of the hydride and the catalyst, and to remove the used hydride from the apparatus. Alternatively, the apparatus can be made large enough to contain the entire supply of the hydride and the catalyst. In addition, the milling apparatus can be coupled with a feed mechanism that directly delivers the released hydrogen to a collection vessel or, alternatively, directly delivers the released hydrogen to an apparatus for which the hydrogen will be used (e.g., a fuel cell, see FIG. 1). The milling equipment, including the milling apparatus and the feed mechanism, can be manufactured from typical materials such as metal, ceramics, minerals or glass. Specific examples of the milling equipment materials include steel and tungsten carbide. As used herein, the term "ball-milling" refers to processing using any such suitable apparatus for carrying out the desired mechanical processing.

As indicated above, the milling apparatus can be coupled to a feed mechanism that directly delivers the released hydrogen to a fuel cell. Such a delivery system is illustrated in FIG. 1. When using such an apparatus, a reaction mixture containing fresh hydride and a catalyst is supplied to the apparatus (shown generally at 10) as needed through valve 12. Valve 14 allows the powder to be circulated during mechanical processing into return path 16 for better homogeneity of the reaction mixture, or to discharge the exhausted powder into a collection vessel, as shown at 18. The flow of high-purity hydrogen may be controlled by using a variable rotational speed 20 of the shaft. Produced hydrogen is then processed through valve 22 and travels through feed mechanism 24, which directly connects the output valve of the milling device 10 to a fuel cell, shown generally at 30. Hydrogen travels through the feed mechanism 24 into the input valve 32 of the fuel cell where it is distributed in a volume 34 and then encounters the catalyst on the anode of the fuel cell 36. Hydrogen is reduced to protons on the anode and, in effect, electrons are generated. The protons then travel to the opposite end (cathode and catalyst 42) of the fuel cell through a selectively-permeable membrane 38, and the electrons travel to the opposite end of the fuel cell via an external electrical path 40, thereby creating an electric current (e.g., to produce power for a motor vehicle). Once the protons and electrons reach the cathode 42 of the fuel cell, they combine with oxygen, which has entered the fuel cell as air through valve 46 and volume 44, to form water molecules. These water molecules then exit the fuel cell via output valve 48 (e.g., as exhaust).

It will be understood that any number of fuel cells can be included in a delivery system as described above. Indeed, a "fuel cell stack" is typically required to generate a desired amount of power. By "fuel cell stack" is meant multiple fuel cells connected in series with each generating a specific amount of power. Collectively, these fuel cells generate a total amount of power, which is sufficient to achieve a desired result (e.g., to power a motor vehicle). The number of fuel cells contained in the stack can be any suitable number and can be determined by a skilled artisan through routine experimentation. Motor vehicles, for example, will generally require at least 40 or more fuel cells connected in series. Accordingly, the number of fuel cells contained in a given fuel cell stack will be determined in large part by the total amount of power needed for a particular machine or device.

The present inventive method allows for the production of pure hydrogen gas, which is free of contaminants, under well-controlled conditions. The present inventive method has an advantage over previously known methods where hydrogen gas is obtained during decomposition of aluminohydrides using chemicals (i.e., chemical treatment) water, alcohol, or ammonia because no water, alcohol, or ammonia vapor is mixed with the produced hydrogen. This enables superior purity of the produced hydrogen gas. It also has an advantage over previously known methods where hydrogen gas is obtained during decomposition of aluminohydrides using thermal treatment because the input of energy (e.g., mechanical energy) and the method overall are much easier to control. Indeed, when using high temperatures, it is impossible to cool down the aluminohydride to stop hydrogen release immediately. On the contrary, mechanical processing can be stopped immediately by terminating the input of the mechanical energy, which will result in the immediate termination of hydrogen release. Accordingly, and pursuant to one aspect of the present invention, the ability to control the initiation and termination of hydrogen release is a feature considered important when used with fuel cells providing motive power for vehicles or the like.

While the inventors do not wish to be bound by any particular theory, it is believed that one of the most likely mechanisms explaining the catalytic effect of metal catalysts is the formation of highly active nanocrystalline or amorphous metallic phase during ball-milling, which subsequently interacts with the aluminohydride. Destabilization of the host crystal lattice caused by the presence of the metal catalyst leads to the formation of metastable "melt-like" hydride phases and promotes the decomposition temperature close to room temperature (about 25° C.). This low temperature decomposition is possibly due to the mechanically induced strain and the presence of metal catalysts.

The following examples further illustrate the invention but, of course, should not be construed as in any way limiting its scope.

EXAMPLES

All experiments set forth below were carried out in a glove box in a purified helium atmosphere and in a hardened-steel vial sealed under helium. Ball-milling (usually about 1.0 g total material) was performed in a Spex 8000 mill using 21 g of steel balls in the hardened-steel vial. Forced air-cooling of the vial was employed to prevent its heating during ball-milling experiments.

The x-ray diffraction (XRD) experiments were performed under helium in a sample holder covered by x-ray transparent polymer film. The differential thermal analysis (DTA) experiments were carried out in an argon atmosphere at ambient pressure using commercially available equipment (Perkin Elmer DTA 7). The heating rate during DTA measurements was 10° C. per minute. The gas-volumetric analysis (GVA) experiments were performed using a standard Sieverts type apparatus. Such an experiment involved evacuating the calibrated apparatus containing the sample at ambient temperature (23° C.), then closing the apparatus and applying heat up to 400° C. (i.e., the temperature above the decomposition temperature of studied hydrides). After the decomposition of the hydride was complete (i.e., there was no further change in the pressure with time), the apparatus was cooled down to room temperature. The pressure of the evolved hydrogen was then measured by a built-in pressure gauge. Thus, residual hydrogen cited in all examples below is the total amount of hydrogen that was additionally obtained from the mechanically processed mixtures by heating to 400° C.

In each case, with the exception of Example 2, the DTA trace of the reaction mixture in the temperature range between 100° C. and 300° C. contained one broad endothermic peak between approximately 120° C. and 215° C. with a minimum at approximately 170° C., which corresponds to the thermal decomposition of the formed $Li_3AlH_6$ and indicates the onset of the endothermic process. The endothermic process occurred at lower temperatures in each case when compared to that observed in the pure mechanochemically prepared $Li_3AlH_6$ (see, e.g., Balema et al., *J. Alloy Compds.*, 313:69 (2000)) (~207–260° C., minimum at 232° C.).

Example 1

This example demonstrates the room temperature production of 5.2 wt. % of pure gaseous hydrogen from $LiAlH_4$ in the presence of catalytic amount of $TiCl_4$.

A reaction mixture containing 1.00 g (26 mmol) $LiAlH_4$ and 0.15 g $TiCl_4$ (0.79 mmol) was subjected to ball-milling for 5 minutes in a Spex mill in a hardened-steel vial sealed under helium using 21 g of steel balls. During the mechanical processing, $LiAlH_4$ released pure gaseous hydrogen. Hydrogen extraction was stopped by terminating mechanical treatment of the reaction mixture of $LiAlH_4$ with $TiCl_4$. After ball-milling, the material was recovered from the vial in a glove box and analyzed by XRD, DTA, and GVA. In addition to the reaction mixture described above, $Li_3AlH_6$ was prepared mechanochemically and subjected to XRD.

The production of pure gaseous hydrogen from a solid hydride by catalysis involves the following chemical reactions represented by Equations 3 and 4. Equation 3 summarizes transformations of $LiAlH_4$ and $TiCl_4$ during ball-milling. Equation 4 corresponds to the thermal decomposition of the formed $Li_3AlH_6$ during the DTA and GVA experiments.

$$0.97LiAlH_4+0.03TiCl_4=0.283Li_3AlH_6+0.12LiCl+0.687Al+0.03[Ti]+1.091H_2 \quad (3)$$

$$2Li_3AlH_6=6LiH+Al+3H_2 \quad (4)$$

Figure 2:
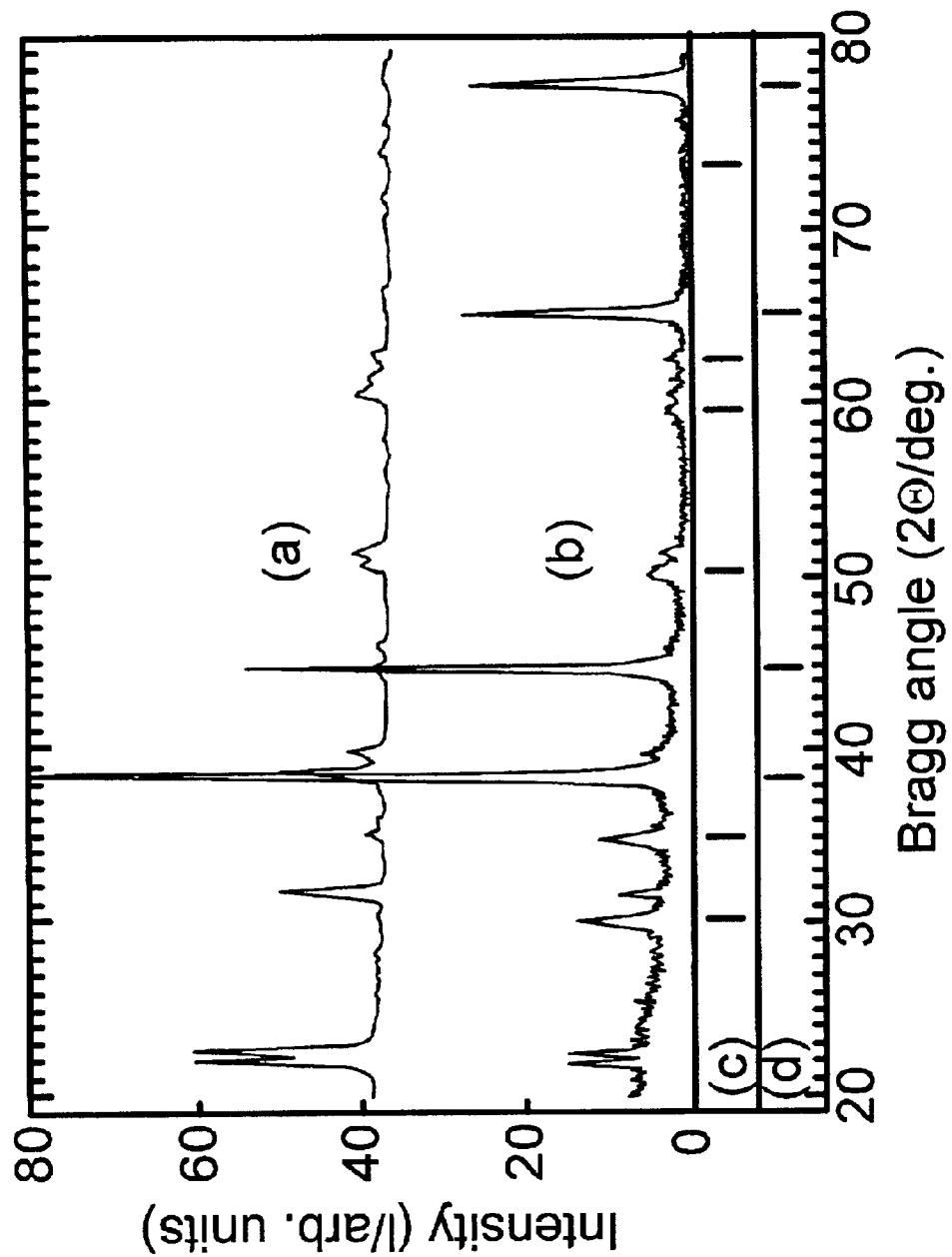
FIG. 2 illustrates an x-ray powder diffraction pattern of (a) Li$_3$AlH$_6$ prepared mechanochemically and (b) the reaction mixture obtained after 5 minutes of mechanical processing of 97 mol. % LiAlH$_4$ and 3 mol. % TiCl$_4$.

According to XRD data (see FIG. 2), $LiAlH_4$ was completely transformed during the short mechanochemical treatment with the catalytic amount of $TiCl_4$. The top plot represents the x-ray powder diffraction pattern of $Li_3AlH_6$ prepared mechanochemically (a) and the bottom plot represents the x-ray powder diffraction pattern of the reaction mixture described above (b). As indicated in FIG. 2, only Bragg peaks corresponding to the crystalline $Li_3AlH_6$, Al (d), and LiCl (c) were seen in the x-ray powder diffraction pattern of the reaction mixture. The intensities of the Bragg peaks were in quantitative agreement with the amounts of reaction products shown in the right hand side of Equation 3.

The DTA trace of the reaction mixture in the temperature range between 100° C. and 300° C. contained one broad endothermic peak between approximately 120° C. and 215° C. with a minimum at 172° C., which corresponds to the thermal decomposition of the formed $Li_3AlH_6$ and indicates the onset of the endothermic process shown in Equation 4.

The GVA of the reaction mixture obtained after ball-milling revealed a total of 5.2 wt. % hydrogen was released from the starting $LiAlH_4$ in the presence of a catalytic amount of $TiCl_4$ during ball-milling at room temperature. The average rate of hydrogen release was 1.04 wt. % hydrogen per minute. The mixture obtained after mechanical processing contained 2.1 wt. % residual hydrogen and consisted of Al, $Li_3AlH_4$ and LiCl (see Equation 3).

As indicated by the results set forth above, 5.2 wt. % hydrogen is produced during the mechanically induced transformation of $LiAlH_4$ into $Li_3AlH_6$ at room temperature in the presence of a catalytic amount of $TiCl_4$.

Example 2

This example demonstrates the room temperature production of 4.7 wt. % of pure gaseous hydrogen from $LiAlH_4$ in the presence of a stoichiometric amount of $TiCl_4$.

A reaction mixture containing 0.70 g (18.4 mmol) $LiAlH_4$ and 0.875 g $TiCl_4$ (4.5 mmol) was subjected to ball-milling for 10 minutes in a Spex mill in a hardened-steel vial sealed under helium using 21 g of steel balls. During the mechanical processing, $LiAlH_4$ released pure gaseous hydrogen. After ball-milling, the material was recovered from the vial in a glove box and analyzed by XRD and GVA.

The production of pure gaseous hydrogen from a solid hydride by the addition of a stoichiometric amount of $TiCl_4$ involves the following transformations represented by Equation 5.

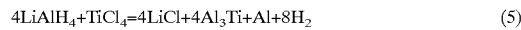

$$4LiAlH_4+TiCl_4=4LiCl+4Al_3Ti+Al+8H_2 \quad (5)$$

Figure 3:
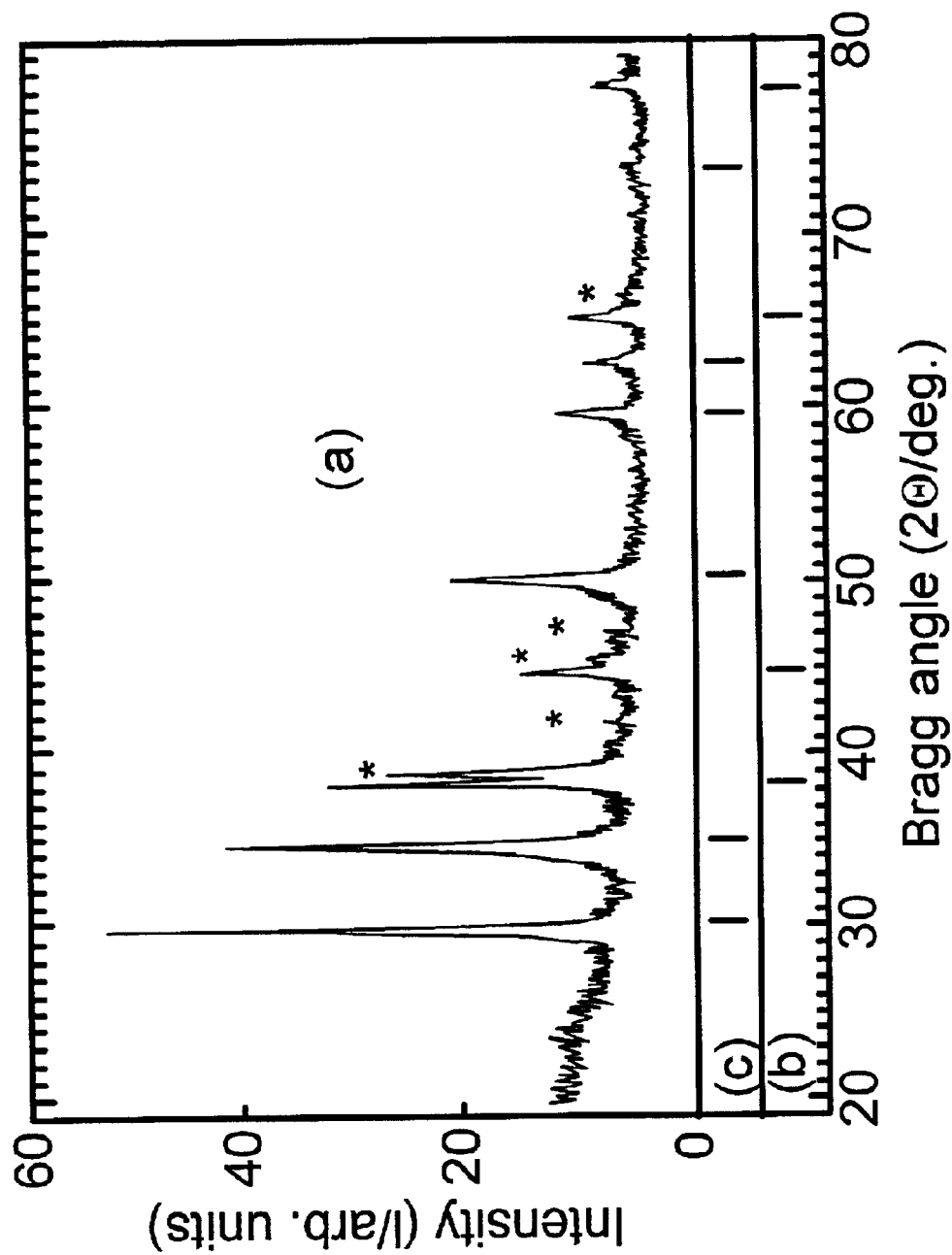
FIG. 3 illustrates an x-ray powder diffraction pattern of (a) the reaction mixture obtained after 10 minutes of mechanical processing of stoichiometric amounts (4:1) of LiAlH$_4$ and TiCl$_4$.

According to the XRD data (see FIG. 3), all available hydrogen was released from $LiAlH_4$ during ball-milling of stoichiometric amounts (4:1) of $LiAlH_4$ and $TiCl_4$ (a). Indeed, as indicated in FIG. 3 only LiCl (c), Al (b), and a micro-crystalline $Al_3Ti$ phase (indicated by asterisks) were seen in the x-ray powder diffraction pattern of the reaction mixture. No Bragg peaks corresponding to either $LiAlH_4$ or $Li_3AlH_6$ were detected. The intensities of Bragg peaks were in quantitative agreement with the amounts of reaction products shown in the right hand side of Equation 5.

The GVA of the reaction mixture obtained after ball-milling revealed the entire hydrogen content (4.7 wt. %) of the starting composite material ($4LiAlH_4+TiCl_4$) was released during ball-milling. The average rate of hydrogen release was 0.47 wt. % hydrogen per minute. The mixture obtained after mechanical processing contained no residual hydrogen and consisted of Al, LiCl and $Al_3Ti$ (see also Balema et al., supra).

As indicated by the results set forth above, 4.7% wt. % hydrogen is produced during the mechanically induced transformation of $LiAlH_4$ into LiCl, Al, and $Al_3Ti$ at room temperature in the presence of stoichiometric amount of $TiCl_4$.

Example 3

This example demonstrates the room temperature production of 5 wt. % of pure gaseous hydrogen from $LiAlH_4$ in the presence of iron (Fe).

A reaction mixture containing 1.20 g (31.6 mmol) $LiAlH_4$ and 0.012 g Fe (0.2 mmol, 1 wt. %) was subjected to ball-milling for 110 hours in a Spex mill in a hardened-steel vial sealed under helium using 21 g of steel balls. During mechanical processing, $LiAlH_4$ released pure gaseous hydrogen. Hydrogen extraction was stopped by terminating mechanical treatment of the mixture of $LiAlH_4$ with 1 wt. % Fe. After ball-milling, the material was recovered from the vial in a glove box and analyzed by XRD, DTA, and GVA. In addition to the reaction mixture described above, $Li_3AlH_6$ was prepared mechanochemically and subjected to XRD.

Figure 4:
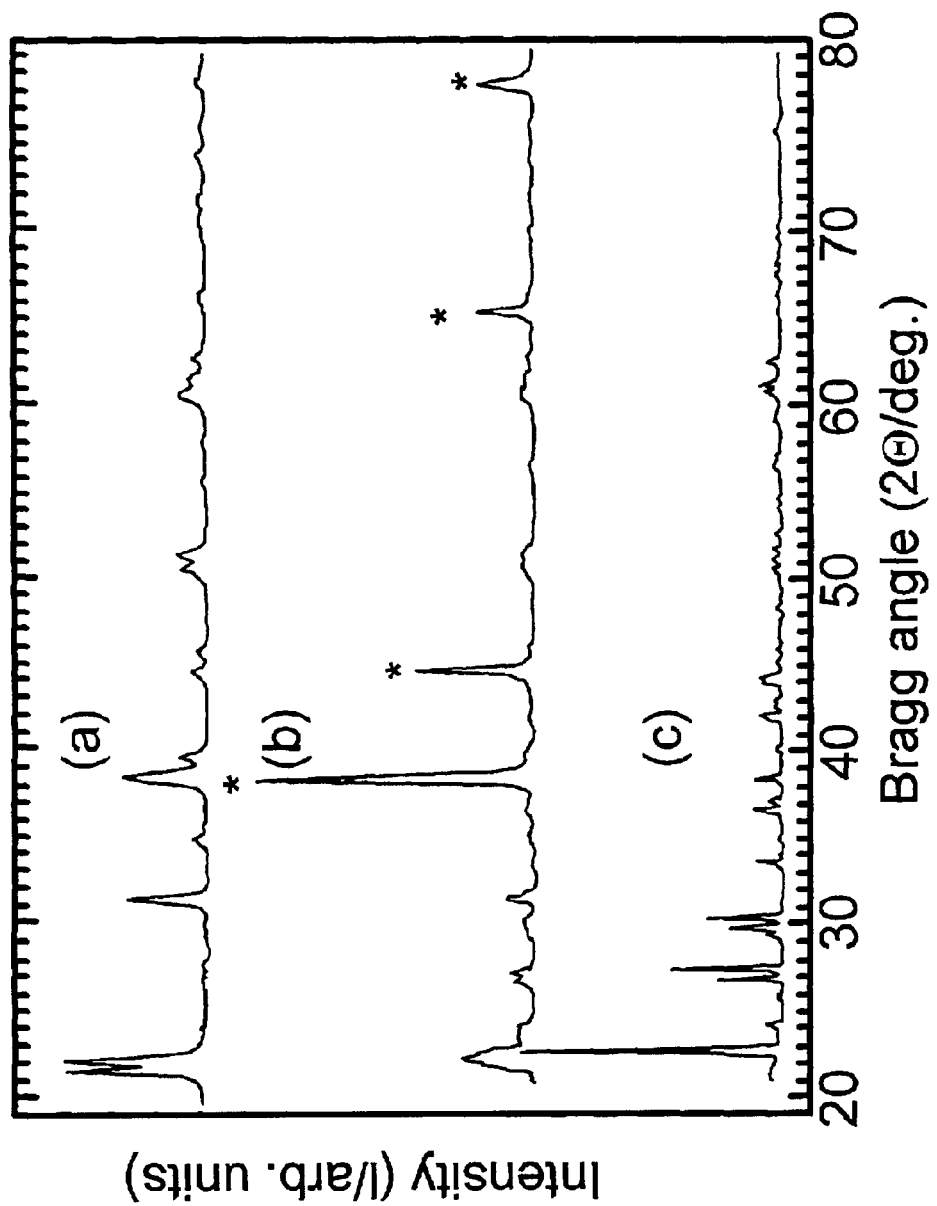
FIG. 4 illustrates an x-ray powder diffraction pattern of (a) Li$_3$AlH$_6$ prepared mechanochemically, (b) the reaction mixture obtained after 110 hours of mechanical processing of LiAlH$_4$ and 1 wt. % iron, and (c) the starting LiAlH$_4$.

According to the XRD data (see FIG. 4), the ball-milling of $LiAlH_4$ in the presence of catalytic amounts of metallic iron powder (1–10 wt. % of Fe in $LiAlH_4$) for about 110 hours leads to the formation of Al, $Li_3AlH_6$ and $H_2$ (b). Also as indicated in FIG. 4, the top plot represents the x-ray powder diffraction pattern of $Li_3AlH_6$ prepared mechanochemically (a) and the bottom plot represents the starting $LiAlH_4$ (c).

The DTA trace of the reaction mixture in the temperature range between 100° C. and 300° C. contained one broad endothermic peak between approximately 160° C. and 230° C. with a minimum at 205° C., which corresponds to the thermal decomposition of the formed $Li_3AlH_6$ and indicates the onset of the endothermic process.

The GVA of the reaction mixture obtained after ball-milling revealed a total of 5 wt. % hydrogen was released from the starting $LiAlH_4$ in the presence of Fe during ball-milling at room temperature. The average rate of hydrogen release was 0.045 wt. % hydrogen per hour. The mixture obtained after ball-milling contained 2.7 wt. % residual hydrogen.

As indicated by the results set forth above, 5 wt. % hydrogen is produced during the mechanically induced transformation of $LiAlH_4$ into $Li_3AlH_6$ at room temperature in the presence of iron.

Example 4

This example demonstrates the room temperature production of 5 wt. % of pure gaseous hydrogen from $LiAlH_4$ in the presence of a catalytic amount of $Al_3Ti$.

A reaction mixture containing 1.20 g (31.6 mmol) LiAlH and 0.12 g $Al_3Ti$ (0.9 mmol) was subjected to ball-milling for 25 hours in a Spex mill in a hardened-steel vial sealed under helium using 21 g of steel balls. During mechanical processing, $LiAlH_4$ released pure gaseous hydrogen. Hydrogen extraction was stopped by terminating mechanical treatment of the mixture of $LiAlH_4$ with $Al_3Ti$. After ball-milling for 7.5 hours, the sample was analyzed using solid-state magic angle spinning $^{27}Al$ NMR spectroscopy ($^{27}Al$ MAS NMR) and XRD. After 25 hours of mechanical processing, the material was recovered from the vial in a glove box and analyzed by GVA. In addition to the reaction mixture described above, $Li_3AlH_6$ was prepared mechanochemically and subjected to XRD.

Figure 5:
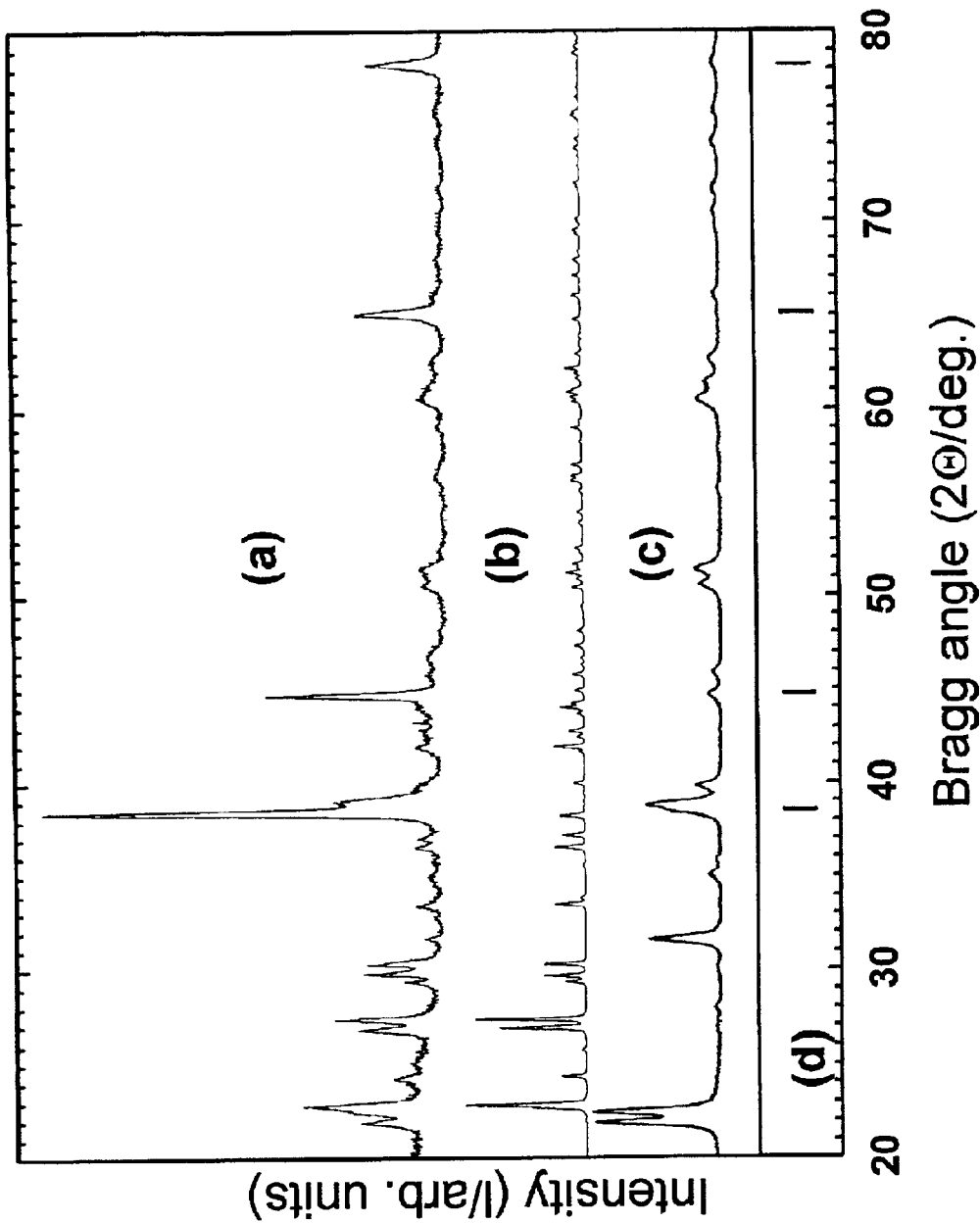
FIG. 5 illustrates an x-ray powder diffraction pattern of (a) the reaction mixture obtained after 7.5 hours of mechanical processing of LiAlH$_4$ and 3 mol. % Al$_3$Ti, (b) the starting LiAlH$_4$, and (c) Li$_3$AlH$_6$ prepared mechanochemically.
Figure 6:
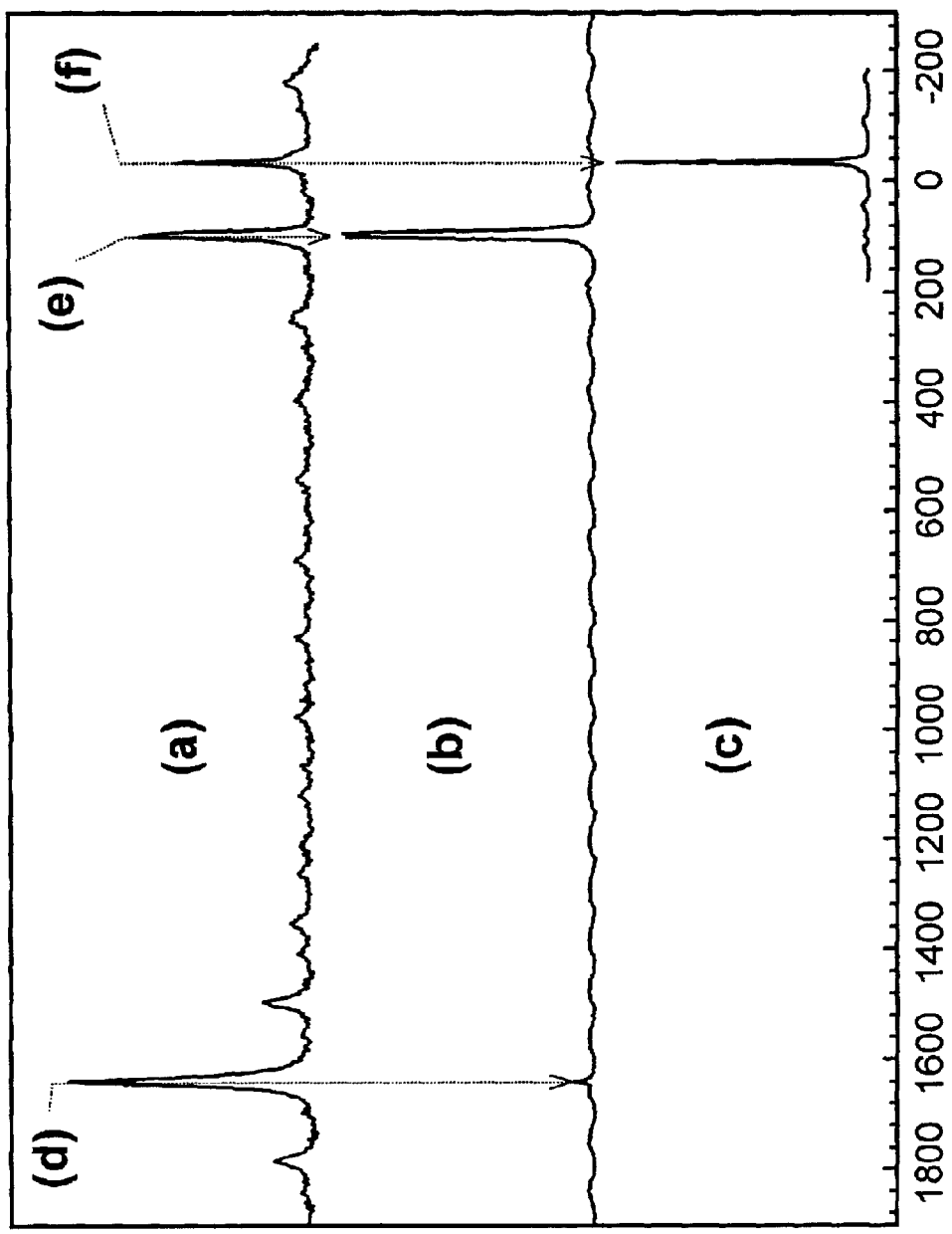
FIG. 6 illustrates a solid-state magnetic spinning $^{27}$Al NMR ($^{27}$Al MAS NMR) spectrum of (a) the reaction mixture obtained after 7.5 hours of mechanical processing of LiAlH$_4$ and 3 mol. % Al$_3$Ti, (b) the starting commercial LiAlH$_4$ containing trace amounts of Al, and (c) Li$_3$AlH$_6$ prepared mechanochemically.

According to the XRD data (see FIG. 5), the ball-milling of $LiAlH_4$ in the presence of catalytic amounts of $Al_3Ti$ for 7.5 hours leads to the formation of Al (d), $Li_3AlH_6$ and $H_2$ (a). Also as indicated in FIG. 5, the middle plot represents the x-ray powder diffraction pattern of the starting $LiAlH_4$ (a) and the bottom plot represents the x-ray powder diffraction pattern of the $Li_3AlH_6$ prepared mechanochemically (c). The intensities of peaks in the solid-state NMR spectrum and the XRD pattern indicated that about 50% of $LiAlH_4$ in the sample ball-milled for 7.5 hours was transformed into $Li_3AlH_6$ and Al (see also Balema et al., supra). Also as indicated by the solid-state NMR spectrum (see FIG. 6), the top plot represents the x-ray powder diffraction pattern of the reaction mixture described above after 7.5 hours of mechanical processing (a), the middle plot represents the x-ray powder diffraction pattern of the starting $LiAlH_4$ (b), and the bottom plot represents the x-ray powder diffraction pattern of the $Li_3AlH_6$ prepared mechanochemically (c). Isotropic NMR's of Al (d), $LiAlH_4$ (e), and $Li_3AlH_6$ (f) are represented by arrows.

The GVA of the reaction mixture obtained after ball-milling for 25 hours revealed that a total of 4.5 wt. % hydrogen was released from the starting $LiAlH_4$ in the presence of $Al_3Ti$ during ball-milling at room temperature. The average rate of hydrogen release was 0.18 wt. % hydrogen per hour. The mixture obtained after ball-milling contained 2.6 wt. % residual hydrogen.

As indicated by the results set forth above, 5 wt. % hydrogen is produced during the mechanically induced transformation of $LiAlH_4$ into Al, $Li_3AlH_6$, and hydrogen at room temperature in the presence of a catalytic amount of $Al_3Ti$.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of extracting hydrogen from a solid hydride, which method comprises processing the solid hydride at ambient temperature to release hydrogen from the hydride; and collecting the released hydrogen, wherein the solid hydride has a storage capacity of at least 4.5 wt. % hydrogen, and wherein the processing is performed in the absence of chemical treatment.

2. The method of claim 1, wherein the solid hydride is selected from the group consisting of lithium aluminum hydride (LiAlH$_4$), sodium aluminum hydride (NaAlH$_4$), magnesium aluminum hydride (Mg(AlH$_4$)$_2$), and aluminum hydride (AlH$_3$).

3. The method of claim 1, wherein the solid hydride has the general formula:

$$M'_xM_y(AlH_n)_z,$$

wherein M' is an alkali metal, M is an alkaline earth metal, x is 0 or 1, y is an integer between 0 and 3, z is an integer between 1 and 7, and n is an integer between 3 and 6.

4. The method of claim 3, wherein the alkali metal is selected from the group consisting of Li, Na, and K.

5. The method of claim 3, wherein the alkaline earth metal is selected from the group consisting of Mg, Ca, Sr, and Ba.

6. The method of claim 1, wherein the method is conducted in the absence of a solvent.

7. The method of claim 1, wherein at least 4.5 wt. % hydrogen is released and collected from the solid hydride.

8. The method of claim 7, wherein at least 5 wt. % hydrogen is released and collected from the solid hydride.

9. A method of extracting hydrogen from a solid hydride, which method comprises mechanically processing the solid hydride at a temperature of about −200° C. to about 100° C. in the presence of a catalyst to release hydrogen from the hydride; and collecting the released hydrogen.

10. The method of claim 9, wherein the mechanical processing step is conducted at ambient temperature.

11. The method of claim 9, wherein the solid hydride is selected from the group consisting of lithium aluminum hydride (LiAlH$_4$), sodium aluminum hydride (NaAlH$_4$), magnesium aluminum hydride (Mg(AlH$_4$)$_2$), and aluminum hydride (AlH$_3$).

12. The method of claim 9, wherein the solid hydride has the general formula:

$$M'_xM_y(AlH_n)_z,$$

wherein M' is an alkali metal, M is an alkaline earth metal, x is 0 or 1, y is an integer between 0 and 3, z is an integer between 1 and 7, and n is an integer between 3 and 6.

13. The method of claim 12, wherein the alkali metal is selected from the group consisting of Li, Na, and K.

14. The method of claim 12, wherein the alkaline earth metal is selected from the group consisting of Mg, Ca, Sr, and Ba.

15. The method of claim 9, wherein the catalyst is selected from the group consisting of one or more transition metals, lanthanides, mixtures thereof, and derivatives thereof.

16. The method of claim 15, wherein the catalyst comprises titanium or iron.

17. The method of claim 9, wherein the method is conducted in the absence of a solvent.

18. The method of claim 9, wherein at least 4.5 wt. % hydrogen is released and collected from the solid hydride.

19. The method of claim 18, wherein at least 5 wt. % hydrogen is released and collected from the solid hydride.

20. A method of providing power to a motor vehicle comprising, (a) processing a solid hydride at ambient temperature to release hydrogen from the solid hydride, wherein the solid hydride has a storage capacity of at least 4.5 wt. % hydrogen, and wherein the processing is performed in the absence of chemical treatment, and (b) delivering the released hydrogen to a fuel cell contained in the motor vehicle, such that the hydrogen is converted into electrical energy; thereby providing power to the motor vehicle.

21. A method of providing power to a motor vehicle comprising, (a) mechanically processing a solid hydride at a temperature of about −200° C. to about 100° C. in the presence of a catalyst to release hydrogen from the hydride, and (b) delivering the released hydrogen to a fuel cell contained in the motor vehicle, such that the hydrogen is converted into electrical energy; thereby providing power to the motor vehicle.

* * * * *